3,278,603
PROCESS FOR PREPARING AROMATIC AMINES
Edward Vincent Cooke, Manchester, England, assignor to Imperial Chemical Industries Limited, London, England, a corporation of Great Britain
No Drawing. Filed Oct. 5, 1964, Ser. No. 401,642
Claims priority, application Great Britain, Sept. 24, 1962, 36,185/62
13 Claims. (Cl. 260—580)

This invention relates to a process for the manufacture of aromatic amines of the benzene series.

The present application is a continuation-in-part of application Serial No. 246,019 filed December 20, 1962, now abandoned.

It has already been proposed to manufacture aromatic amines by the catalytic hydrogenation of nitro aromatic compounds in the liquid or vapour phase. For liquid phase hydrogenations palladium on charcoal, and supported cobalt, nickel or copper catalysts have been suggested for example as further described in U.S. Patent No. 2,292,879. However it has been found that when such catalysts are used in liquid phase hydrogenations, various impurities are generated which decrease the yield and are also expensive to remove.

It has now been found that the formation of impurities in the manufacture of aromatic amines of the benzene series by liquid phase hydrogenation of the corresponding nitro compounds can be reduced by conducting the hydrogenation in the presence of a metal catalyst which has been modified by contact with an alkanolamine containing up to 9 carbon atoms. It is convenient to modify the catalyst by addition of the alkanolamine to the reaction medium containing the unmodified catalyst.

According to the present invention there is provided a process for the manufacture of aromatic amines of the benzene series by the liquid phase hydrogenation of the correspuonding nitro compounds, characterised in that the hydrogenation is performed in the presence of a metal hydrogenation catalyst which has been modified by contact with an alkanolamine containing up to 9 carbon atoms.

Nitro aromatic compounds of the benzene series which may by hydrogenated according to the present invention are for example nitrobenzene, nitrotoluenes, nitro-xylenes and dinitrobenzenes. The modified catalysts are particularly suitable for the hydrogenation of nitrobenzene.

The hydrogenation may be conducted at or above atmospheric pressure, for example, from 1 to 5 atmospheres, and at elevated temperature. Usually it is not necessary to exceed pressures of about 50 atmospheres. Temperatures above 100° C. and below 200° C. are usually preferred.

Using metal catalysts such as Raney nickel or supported metal catalysts such as nickel on kieselguhr or chemically prepared silica, from 1 to 20 parts of catalyst per 100 parts of reaction mixture are preferred proportions.

When the alkanolamine used to modify the catalyst is added directly to the reaction mixture, it is employed in an amount ranging from 20% to 200% by weight of the catalyst and preferably in about an equal amount by weight. During the course of the reaction, the added alkanolamine is found to disappear from the reaction mixture, but the catalyst continues to produce the aromatic amine with an impurity content less than that obtainable from reaction mixtures to which no alkanolamine has been added.

Suitable alkanolamines are for example monoethanolamine, diethanolamine, triethanolamine, isopropanolamine, 3-hydroxypropylamine and triisopropanolamine.

The invention is illustrated but not limited by the following examples.

*Example 1.*—Aniline made from nitrobenzene of low sulphur content is charged into a vessel fitted with an agitator, a jacket and a reflux condenser maintained at about 100° C. and connected to the total condenser. Nickel-on-kieselguhr catalyst (10%, based on the weight of aniline) and an amount of triethanolamine equal to the weight of catalyst are charged.

The vessel is heated by passing steam through the jacket to a temperature of 120° C. and low sulphur content nitrobenzene equal to 5% of the aniline is charged to the vessel.

Hydrogen is then fed into the vessel through a pipe delivering near the bottom. The nitrobenzene is reduced to aniline and water is formed as a by-product at a rate dependent upon the hydrogen feed. The water boils off together with some of the aniline. The excess of aniline is condensed in the reflux condenser and returns to the reactor. A small amount passes on as the aniline-water azeotrope and is condensed at the final condenser, the condensate separating into two layers.

When the initial nitrobenzene charge has been reduced, a further addition of nitrobenzene can be made to the reaction mixture and the reduction continued.

The bulk of the aniline product is recovered from the liquors in the reaction vessel by filtration and distillation. After distillation, it forms a clear water white or slightly yellowish oil containing only small traces of impurities.

When the process is repeated in the absence of triethanolamine the product after distillation has a strong ammoniacal odour and a boiling range several degrees wider than before, owing to the presence of impurities, some of which are more volatile, and some less volatile than aniline.

*Example 2.*—The procedure of Example 1 is repeated using o-nitrotoluene dissolved in o-toluidine as starting material. The o-toluidine obtained in the presence of triethanolamine has a lower by-product content than when triethanolamine is omitted.

*Example 3.*—900 grams of aniline made from nitrobenzene having a low sulphur content were charged into a vessel fitted with an agitator, a heated jacket and a reflux condenser maintained at about 100° C. to return part of the evaporated aniline to the reactor and connected to a total condenser to condense the rest of the vapours, mainly aniline and water. 45 grams nickel-on-kieselguhr catalyst (5% of the weight of aniline) and an amount of alkanolamine equal to the weight of catalyst were also charged. The vessel was heated to 140–150° C. and low-sulphur nitrobenzene was added continuously at a rate corresponding to about 7½% of the aniline charge per hour. Simultaneously, hydrogen was fed into the vessel through a pipe delivering to the bottom at a rate of 85 litres/hour measured at atmospheric pressure and ambient temperature. The water produced in the reaction was boiled off together with some aniline and the volatile by-products. The excess aniline was condensed in the reflux condenser and returned to the reactor. The water vapour and an amount of aniline equivalent to the added nitrobenzene were condensed at the total condenser. The condensate separated into two layers, an aqueous upper layer and an aniline lower layer. The aniline layer was collected and subjected to analysis for cyclohexylamine using gas liquid chromatography.

Comparative results obtained with various alkanolamine additives are listed in the following table together with the results of hydrogenations performed under identical conditions, except for the absence of alkanolamine.

| Alkanolamine: | Cyclohexylamine content of product average over 8 hours, percent |
|---|---|
| No addition | 4.9 |
| Mono-ethanolamine | 0.06 |
| Diethanolamine | 0.06 |
| Mono-isopropanolamine | 0.17 |
| Tri-isopropanolamine | 1.02 |
| 3-hydroxy-propylamine | 0.24 |

What I claim is:

1. A process for the manufacture of an aromatic amine of the benzene series by liquid phase hydrogenation of the corresponding aromatic nitro hydrocarbon compound containing from 1 to 2 nitro groups, said hydrocarbon being selected from the group consisting of benzene, toluene and xylene, which comprises carrying out said hydrogenation at a temperature between 100° C. and 200° C. and in the presence of a supported nickel catalyst modified by contact with an alkanolamine containing up to 9 carbon atoms.

2. The process of claim 1 wherein the nickel catalyst is modified by addition of the alkanolamine to the reaction medium.

3. The process of claim 1 wherein the nickel is supported on kieselguhr or silica.

4. The process of claim 1 wherein the catalyst is Raney nickel and is present in an amount of from 1 part to 20 parts per 100 parts of the reaction mixture.

5. The process of claim 1 wherein the alkanolamine is present in amounts of from 20% to 200% by weight of the catalyst.

6. A process for the manufacture of a monocyclic aromatic amine by liquid phase hydrogenation of the corresponding nitro hydrocarbon compound containing from 1 to 2 nitro groups, said hydrocarbon being selected from the group consisting of benzene, toluene and xylene, which comprises carrying out said hydrogenation at a temperature of up to 200° C. in the presence of a supported nickel catalyst modified by contact with an alkanolamine containing up to 9 carbon atoms.

7. A process for the manufacture of aniline by liquid phase hydrogenation of nitrobenzene which comprises carrying out said hydrogenation at a temperature between 100° and 200° C. in the presence of a nickel catalyst modified by contact with an alkanolamine containing up to 9 carbon atoms.

8. The process according to claim 7 wherein the alkanolamine is monoethanolamine, diethanolamine, triethanolamine, isopropanolamine, 3-hydroxypropylamine and triisopropylamine.

9. The process of claim 7 wherein the nickel catalyst is supported on kieselguhr.

10. The process of claim 7 wherein the nickel catalyst is Raney nickel.

11. The process according to claim 8 wherein the hydrogenation is conducted at a pressure up to 50 atmospheres.

12. The process according to claim 11 wherein the pressure is between 1–5 atmospheres.

13. The process according to claim 12 wherein the alkanolamine is present in amounts of from 20 to 200% by weight of the catalyst.

References Cited by the Examiner
UNITED STATES PATENTS

| | | | |
|---|---|---|---|
| 2,292,879 | 8/1942 | Kise | 260—580 X |
| 2,688,040 | 8/1954 | Adams et al. | 260—580 X |
| 3,063,980 | 11/1962 | Bloom et al. | 260—580 X |

CHARLES B. PARKER, *Primary Examiner.*

DALE R. MAHANAND, DONALD M. PAPUGA,
*Assistant Examiners.*